US009453660B2

(12) United States Patent
French et al.

(10) Patent No.: US 9,453,660 B2
(45) Date of Patent: Sep. 27, 2016

(54) VEHICLES AND METHODS FOR MAGNETICALLY MANAGING LEGS OF RAIL-BASED PHOTOVOLTAIC MODULES DURING INSTALLATION

(71) Applicant: Alion Energy, Inc., Richmond, CA (US)

(72) Inventors: Adam French, San Francisco, CA (US); Timothy Wheeler, Richmond, CA (US); Kevin Hennessy, Walnut Creek, CA (US); Jess Crowe, San Ramon, CA (US); Luis Francisco Castro Hernandez, Richmond, CA (US)

(73) Assignee: Alion Energy, Inc., Richmond, CA (US)

( * ) Notice: Subject to any disclaimer, the term of this patent is extended or adjusted under 35 U.S.C. 154(b) by 0 days.

(21) Appl. No.: 14/481,678

(22) Filed: Sep. 9, 2014

(65) Prior Publication Data
US 2015/0069001 A1    Mar. 12, 2015

Related U.S. Application Data

(60) Provisional application No. 61/876,666, filed on Sep. 11, 2013.

(51) Int. Cl.
*F24J 2/52* (2006.01)
*H01L 31/042* (2014.01)

(52) U.S. Cl.
CPC .............. *F24J 2/523* (2013.01); *H02S 20/00* (2013.01); *H02S 40/00* (2013.01); *F24J 2002/5281* (2013.01); *Y02E 10/47* (2013.01); *Y02E 10/50* (2013.01)

(58) Field of Classification Search
CPC ... B25J 15/0608; B25J 15/0616; F24J 2/523; B66F 9/181
USPC .......... 414/626, 627, 814, 737, 752.1; 294/2, 294/185
See application file for complete search history.

(56) References Cited

U.S. PATENT DOCUMENTS

| 3,334,217 A | 8/1967 | Bickler et al. |
| 3,951,506 A | 4/1976 | Bennett et al. |

(Continued)

FOREIGN PATENT DOCUMENTS

| CN | 101858659 | 10/2010 |
| CN | 202019322 | 10/2011 |

(Continued)

OTHER PUBLICATIONS

Patent Cooperation Treaty, International Search Report for PCT/US14/54916 mailed Dec. 24, 2014 (2 pages).

(Continued)

*Primary Examiner* — Kaitlin Joerger
(74) *Attorney, Agent, or Firm* — Jones Day (57) ABSTRACT

An exemplary method for installing at an installation site a photovoltaic module including a panel and support legs includes disposing the photovoltaic module over a support surface such that the support legs are in a stowed position; lifting the photovoltaic module from a support surface while engaging a magnetic field with the support legs so as to maintain the support legs in the stowed position; disengaging the magnetic field from the support legs of the lifted photovoltaic module so as to release the support legs from the stowed position to an installation position in which the support legs are rotated downwards relative to the stowed position; and lowering the photovoltaic module to the installation site with the support legs in the installation position so as to install the photovoltaic module at the installation site, the support legs supporting the panel at the installation site.

19 Claims, 9 Drawing Sheets

(56) References Cited

U.S. PATENT DOCUMENTS

| | | | |
|---|---|---|---|
| 4,145,021 A | 3/1979 | Gaechter et al. | |
| 4,219,926 A | 9/1980 | Frosch et al. | |
| 4,279,347 A | 7/1981 | Appleman et al. | |
| 4,290,416 A | 9/1981 | Maloney et al. | |
| 4,296,270 A | 10/1981 | Kohler et al. | |
| 4,301,322 A | 11/1981 | Amick et al. | |
| 4,301,409 A | 11/1981 | Miller et al. | |
| 4,371,139 A | 2/1983 | Clark | |
| 4,421,943 A | 12/1983 | Withjack et al. | |
| 4,496,063 A * | 1/1985 | Ishii | B66C 17/06 212/270 |
| 4,664,270 A | 5/1987 | Voelz | |
| 4,667,834 A | 5/1987 | Lanigan et al. | |
| 4,676,713 A * | 6/1987 | Voelpel | B65G 49/061 414/590 |
| 4,706,825 A | 11/1987 | Johnson | |
| 4,876,143 A | 10/1989 | Sugita et al. | |
| 4,877,365 A | 10/1989 | Lanigan Jr. et al. | |
| 4,880,346 A | 11/1989 | Brassette et al. | |
| 4,995,377 A | 2/1991 | Eiden et al. | |
| 5,125,608 A | 6/1992 | McMaster et al. | |
| 5,143,556 A | 9/1992 | Matlin | |
| 5,152,109 A | 10/1992 | Boers | |
| D335,541 S | 5/1993 | Rosario-Cartagena | |
| 5,228,924 A | 7/1993 | Barker et al. | |
| 5,232,519 A | 8/1993 | Glatfelter et al. | |
| 5,257,891 A | 11/1993 | Baumann et al. | |
| 5,361,704 A | 11/1994 | Bounds | |
| 5,460,660 A | 10/1995 | Albright et al. | |
| 5,501,744 A | 3/1996 | Albright et al. | |
| 5,505,788 A | 4/1996 | Dinwoodie | |
| 5,568,713 A | 10/1996 | Gagne et al. | |
| 5,593,901 A | 1/1997 | Oswald et al. | |
| 5,715,958 A | 2/1998 | Feider et al. | |
| 5,800,631 A | 9/1998 | Yamada et al. | |
| 5,816,769 A | 10/1998 | Bauer et al. | |
| 5,826,734 A | 10/1998 | Baumann et al. | |
| 6,037,578 A | 3/2000 | Grandjean et al. | |
| 6,046,399 A | 4/2000 | Kapner | |
| 6,058,930 A | 5/2000 | Shingleton | |
| 6,111,189 A | 8/2000 | Garvison et al. | |
| 6,201,181 B1 | 3/2001 | Azzam et al. | |
| 6,233,502 B1 | 5/2001 | Yim | |
| 6,495,750 B1 | 12/2002 | Dinwoodie | |
| 6,590,363 B2 | 7/2003 | Teramoto | |
| 6,639,421 B1 | 10/2003 | Yoshino et al. | |
| 6,722,357 B2 | 4/2004 | Shingleton | |
| 6,730,841 B2 | 5/2004 | Heckeroth | |
| 6,809,251 B2 | 10/2004 | Dinwoodie | |
| 7,086,675 B2 * | 8/2006 | Jacobs | B65G 47/90 294/183 |
| 7,252,083 B2 | 8/2007 | Hayden | |
| 7,309,850 B2 | 12/2007 | Sinton et al. | |
| 7,374,137 B2 | 5/2008 | Staney | |
| 7,411,408 B2 | 8/2008 | Shimotomai et al. | |
| 7,476,832 B2 | 1/2009 | Vendig et al. | |
| 7,492,120 B2 | 2/2009 | Benn et al. | |
| 7,531,741 B1 | 5/2009 | Melton et al. | |
| 7,546,929 B2 | 6/2009 | Wierzba et al. | |
| 7,712,807 B2 * | 5/2010 | Perlman | B25B 11/005 294/185 |
| 7,799,987 B1 | 9/2010 | Hines et al. | |
| 7,814,899 B1 * | 10/2010 | Port | F24J 2/5211 126/571 |
| 7,888,588 B2 | 2/2011 | Shingleton | |
| 7,898,212 B2 | 3/2011 | Benn et al. | |
| 7,963,578 B2 * | 6/2011 | Wells | B66C 1/0212 294/2 |
| 8,006,624 B2 | 8/2011 | Sin | |
| 8,203,237 B1 | 6/2012 | Cowles | |
| 8,245,459 B2 | 8/2012 | Belikoff et al. | |
| 8,371,076 B2 | 2/2013 | Jones et al. | |
| 8,407,950 B2 | 4/2013 | Hartelius | |
| 8,464,496 B2 | 6/2013 | Cusson et al. | |
| 8,492,645 B1 | 7/2013 | Strahm | |
| 8,500,918 B1 | 8/2013 | Meller et al. | |
| 8,550,419 B2 | 10/2013 | Hausner et al. | |
| 8,573,545 B2 | 11/2013 | Walquist et al. | |
| 8,578,928 B2 | 11/2013 | Lumbreras | |
| 8,607,512 B2 | 12/2013 | Batut | |
| 8,609,977 B2 | 12/2013 | Jones et al. | |
| 8,635,818 B2 | 1/2014 | Wildes | |
| 8,657,991 B2 * | 2/2014 | Potter | F24J 2/5205 136/251 |
| 8,752,343 B2 | 6/2014 | Kuan et al. | |
| 8,962,972 B2 | 2/2015 | Sagayama | |
| 2003/0075211 A1 | 4/2003 | Makita et al. | |
| 2004/0250491 A1 | 12/2004 | Diaz et al. | |
| 2005/0061360 A1 | 3/2005 | Horioka et al. | |
| 2005/0268959 A1 | 12/2005 | Aschenbrenner et al. | |
| 2006/0054162 A1 | 3/2006 | Romeo | |
| 2006/0174931 A1 | 8/2006 | Mapes et al. | |
| 2006/0290344 A1 | 12/2006 | Shimotomai et al. | |
| 2007/0012352 A1 | 1/2007 | Wohlgemuth et al. | |
| 2007/0215145 A1 | 9/2007 | Hayden | |
| 2007/0283996 A1 | 12/2007 | Hachtmann et al. | |
| 2008/0010915 A1 | 1/2008 | Liebendorfer | |
| 2008/0023069 A1 | 1/2008 | Terada et al. | |
| 2008/0040990 A1 | 2/2008 | Vendig et al. | |
| 2008/0053517 A1 | 3/2008 | Plaisted et al. | |
| 2008/0087320 A1 | 4/2008 | Mapes et al. | |
| 2008/0099063 A1 | 5/2008 | Armstrong et al. | |
| 2008/0121273 A1 | 5/2008 | Plaisted et al. | |
| 2008/0135084 A1 | 6/2008 | Scharlack | |
| 2008/0156365 A1 | 7/2008 | Scholz et al. | |
| 2008/0233429 A1 | 9/2008 | Oguma et al. | |
| 2008/0271774 A1 | 11/2008 | Kalkanoglu et al. | |
| 2008/0306700 A1 | 12/2008 | Kawam et al. | |
| 2009/0014057 A1 | 1/2009 | Croft et al. | |
| 2009/0032100 A1 | 2/2009 | Oak | |
| 2009/0114261 A1 | 5/2009 | Stancel et al. | |
| 2009/0139557 A1 | 6/2009 | Rose et al. | |
| 2009/0173831 A1 | 7/2009 | Roseman | |
| 2009/0191030 A1 | 7/2009 | Bluck et al. | |
| 2009/0205270 A1 | 8/2009 | Shaw et al. | |
| 2009/0223142 A1 | 9/2009 | Shingleton et al. | |
| 2009/0260671 A1 | 10/2009 | Green et al. | |
| 2009/0282755 A1 | 11/2009 | Abbott et al. | |
| 2009/0293932 A1 | 12/2009 | Augenbraun et al. | |
| 2009/0293941 A1 | 12/2009 | Luch | |
| 2009/0308430 A1 | 12/2009 | Everett et al. | |
| 2010/0031996 A1 | 2/2010 | Basol | |
| 2010/0043781 A1 | 2/2010 | Jones et al. | |
| 2010/0108118 A1 | 5/2010 | Luch | |
| 2010/0127142 A1 | 5/2010 | Genschorek | |
| 2010/0147286 A1 | 6/2010 | Xiang et al. | |
| 2010/0175337 A1 | 7/2010 | Mascolo et al. | |
| 2010/0175738 A1 | 7/2010 | Huss et al. | |
| 2010/0206294 A1 | 8/2010 | Blair et al. | |
| 2010/0252092 A1 | 10/2010 | Lenox et al. | |
| 2010/0269429 A1 | 10/2010 | Belikoff et al. | |
| 2010/0269888 A1 | 10/2010 | Johnston, Jr. | |
| 2010/0275975 A1 | 11/2010 | Monschke et al. | |
| 2010/0281791 A1 | 11/2010 | Intagliata et al. | |
| 2010/0319277 A1 | 12/2010 | Suarez et al. | |
| 2010/0325797 A1 | 12/2010 | Horne | |
| 2011/0126178 A1 | 6/2011 | Ota | |
| 2011/0126884 A1 | 6/2011 | Dritsas | |
| 2011/0162691 A1 | 7/2011 | Hartelius | |
| 2011/0173900 A1 | 7/2011 | Plaisted et al. | |
| 2011/0183540 A1 | 7/2011 | Keenihan et al. | |
| 2011/0194900 A1 | 8/2011 | French | |
| 2011/0264306 A1 * | 10/2011 | Bagge | B66C 23/72 701/2 |
| 2011/0284057 A1 | 11/2011 | Swahn et al. | |
| 2011/0309215 A1 | 12/2011 | Lu et al. | |
| 2012/0027550 A1 * | 2/2012 | Bellacicco | B60P 1/00 414/547 |
| 2012/0034799 A1 | 2/2012 | Hunt | |
| 2012/0037214 A1 * | 2/2012 | Sagayama | F24J 2/523 136/251 |
| 2012/0056638 A1 | 3/2012 | Swahn | |
| 2012/0067738 A1 | 3/2012 | Field | |
| 2012/0090176 A1 | 4/2012 | Stancel et al. | |

(56) References Cited

U.S. PATENT DOCUMENTS

| | | | |
|---|---|---|---|
| 2012/0131866 A1 | 5/2012 | Batut | |
| 2012/0132246 A1 | 5/2012 | Hunt et al. | |
| 2012/0132262 A1 | 5/2012 | Sagayama | |
| 2012/0198682 A1 | 8/2012 | Potter et al. | |
| 2012/0198779 A1 | 8/2012 | Tachino | |
| 2012/0199266 A1 | 8/2012 | Potter et al. | |
| 2012/0206294 A1 | 8/2012 | Cho | |
| 2012/0223033 A1 | 9/2012 | Molek | |
| 2013/0068275 A1 | 3/2013 | Swahn et al. | |
| 2013/0133172 A1 | 5/2013 | Kiener et al. | |
| 2013/0180568 A1 | 7/2013 | Hartelius | |
| 2013/0206206 A1 | 8/2013 | Bjorneklett et al. | |
| 2013/0248478 A1 | 9/2013 | Wheeler et al. | |
| 2013/0305518 A1 | 11/2013 | Adriani et al. | |
| 2013/0319962 A1 | 12/2013 | Park et al. | |
| 2013/0340807 A1 | 12/2013 | Gerwing et al. | |
| 2014/0033511 A1 | 2/2014 | Swahn et al. | |
| 2014/0069483 A1 | 3/2014 | Wolter et al. | |
| 2015/0200619 A1 | 7/2015 | Worden | |
| 2015/0316639 A1 | 11/2015 | Russ et al. | |
| 2015/0330040 A1 | 11/2015 | Dobbs | |

FOREIGN PATENT DOCUMENTS

| | | | |
|---|---|---|---|
| CN | 203055930 | 7/2013 | |
| DE | WO 2010145844 A2 * | 12/2010 | ........... B65G 49/062 |
| DE | 102009049926 A1 * | 4/2011 | .............. B66F 9/181 |
| EP | 2505934 | 10/2012 | |
| FR | 2959555 | 11/2011 | |
| WO | WO 2006/117551 | 9/2006 | |
| WO | WO 2010/054274 | 5/2010 | |
| WO | WO 2010/145844 | 12/2010 | |
| WO | WO 2012/003585 | 1/2012 | |

OTHER PUBLICATIONS

Patent Cooperation Treaty International Search Report for PCT/US14/53787 mailed Jan. 12, 2015 (2 pages).
Patent Cooperation Treaty, Written Opinion of the International Searching Authority for PCT/US14/54916 mailed Dec. 24, 2014 (9 pages).
Patent Cooperation Treaty, Written Opinion of the International Searching Authority for PCT/US14/53787 mailed Jan. 12, 2015 (7 pages).
Patent Cooperation Treaty, International Search Report for PCT/US11/027700 mailed May 3, 2011 (2 pages).
Patent Cooperation Treaty, Written Opinion of the International Searching Authority for PCT/US11/027700 mailed May 3, 2011 (4 pages).
Patent Cooperation Treaty, International Search Report for PCT/US11/033722 mailed Jul. 28, 2011 (2 pages).
Patent Cooperation Treaty, Written Opinion of the International Searching Authority for PCT/US11/033722 mailed Jul. 28, 2011 (9 pages).
Patent Cooperation Treaty, International Search Report for PCT/US11/038094 mailed Sep. 2, 2011 (2 pages).
Patent Cooperation Treaty, Written Opinion of the International Searching Authority for PCT/US11/038094 mailed Sep. 2, 2011 (12 pages).
Patent Cooperation Treaty, International Search Report for PCT/US11/046175 mailed Dec. 9, 2011 (2 pages).
Patent Cooperation Treaty, Written Opinion of the International Searching Authority for PCT/US11/046175 mailed Dec. 9, 2011 (8 pages).
Patent Cooperation Treaty, International Search Report for PCT/US12/029345 mailed Oct. 10, 2012 (4 pages).
Patent Cooperation Treaty, Written Opinion of the International Searching Authority for PCT/US12/029345 mailed Oct. 10, 2012 (8 pages).
Patent Cooperation Treaty, International Search Report for PCT/US13/30416 mailed Jun. 17, 2013 (2 pages).
Patent Cooperation Treaty, Written Opinion of the International Searching Authority for PCT/US13/30416 mailed Jun. 17, 2013 (6 pages).
Patent Cooperation Treaty, International Search Report for PCT/US13/40500 mailed Sep. 4, 2013 (2 pages).
Patent Cooperation Treaty, Written Opinion of the International Searching Authority for PCT/US13/40500 mailed Sep. 4, 2013 (9 pages).
United States Patent and Trademark Office, Non final office action dated Nov. 8, 2012 for U.S. Appl. No. 13/043,286 (14 pages).
United States Patent and Trademark Office, Non final office action dated Jan. 10, 2014 for U.S. Appl. No. 13/091,960 (21 pages).
United States Patent and Trademark Office, Non final office action dated Sep. 6, 2013 for U.S. Appl. No. 13/195,562 (15 pages).
United States Patent and Trademark Office, Final office action dated Oct. 7, 2014 for U.S. Appl. No. 13/195,562 (17 pages).
United States Patent and Trademark Office, Non final office action dated Mar. 24, 2014 for U.S. Appl. No. 13/195,562 (24 pages).
United States Patent and Trademark Office, Non final office action dated Sep. 24, 2014 for U.S. Appl. No. 13/421,740 (15 pages).
United States Patent and Trademark Office, Non final office action dated Aug. 8, 2013 for U.S. Appl. No. 13/421,740 (9 pages).
United States Patent and Trademark Office, Final office action dated Mar. 24, 2014 for U.S. Appl. No. 13/421,740 (12 pages).
United States Patent and Trademark Office, Non final office action dated Nov. 19, 2014 for U.S. Appl. No. 13/091,960 (26 pages).
Chinese Patent Office, First Office Action for CN 201280023942.0, mailed Mar. 20, 2015.
European Patent Office, Extended European Search Report for EP 12760313.2-1605 mailed Mar. 25, 2015 (6 pages).
United States Patent and Trademark Office, Non final office action dated May 7, 2015 for U.S. Appl. No. 13/195,562 (17 pages).
United States Patent and Trademark Office, Non final office action dated Mar. 25, 2015 for U.S. Appl. No. 13/794,217 (16 pages).
Chinese Patent Office, Second Office Action for CN 201280023942.0, mailed Feb. 14, 2016, with English translation.
Chinese Patent Office, First Office Action for CN 201380035248.5, mailed Oct. 20, 2015, with English Translation.
United States Patent and Trademark Office, Final office action dated Aug. 26, 2015 for U.S. Appl. No. 13/091,960 (24 pages).
United States Patent and Trademark Office, Non-final office action dated Jan. 12, 2016 for U.S. Appl. No. 13/091,960 (22 pages).
United States Patent and Trademark Office, Notice of allowance dated Nov. 23, 2015 for U.S. Appl. No. 13/195,562 (17 pages).
United States Patent and Trademark Office, Notice of allowance dated Mar. 1, 2016 for U.S. Appl. No. 13/195,562 (15 pages).
United States Patent and Trademark Office, Final office action dated Nov. 20, 2015 for U.S. Appl. No. 13/421,740 (16 pages).
United States Patent and Trademark Office, Non final office action dated Mar. 2, 2016 for U.S. Appl. No. 13/421,740 (17 pages).
United States Patent and Trademark Office, Notice of Allowance dated Nov. 3, 2015 for U.S. Appl. No. 13/794,217 (5 pages).
United States Patent and Trademark Office, Notice of Allowance dated Mar. 28, 2016 for U.S. Appl. No. 13/794,217 (6 pages).
United States Patent and Trademark Office, Non final office action dated Dec. 31, 2015 for U.S. Appl. No. 14/050,237 (7 pages).
United States Patent and Trademark Office, Office Action dated Jun. 28, 2016 for U.S. Appl. No. 14/050,237 (13 pages).
United States Patent and Trademark Office, Office Action dated Jul. 12, 2016 for U.S. Appl. No. 13/892,140 (12 pages).
United States Patent and Trademark Office, Notice of Allowance dated Jun. 14, 2016 for U.S. Appl. No. 13/091,960 (9 pages).

* cited by examiner

VEHICLES AND METHODS FOR MAGNETICALLY MANAGING LEGS OF RAIL-BASED PHOTOVOLTAIC MODULES DURING INSTALLATION

CROSS-REFERENCE TO RELATED APPLICATIONS

This application claims priority to U.S. Provisional Patent Application No. 61/876,666, filed on Sep. 11, 2013, the entire contents of which are incorporated by reference herein.

BACKGROUND OF THE INVENTION

The present invention is directed to installation of photovoltaic modules according to some embodiments. More particularly, certain embodiments of the invention provide vehicles and methods for managing legs of photovoltaic modules during installation. Merely by way of example, the invention has been applied to magnetically managing legs of rail-based photovoltaic modules during installation. But it would be recognized that the invention has a much broader range of applicability.

Figure 1:
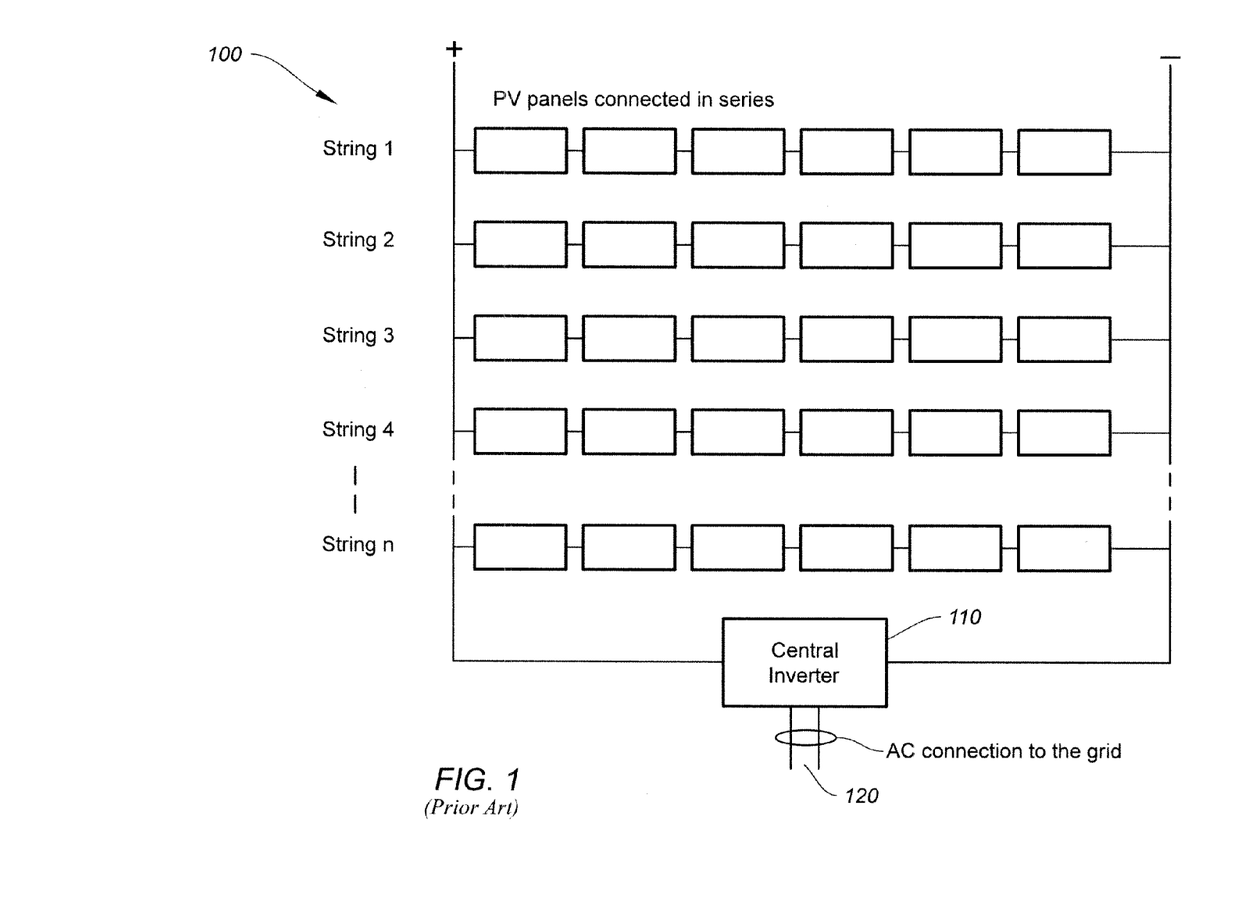
FIG. 1 is a simplified diagram of a conventional photovoltaic array.
Figure 2:
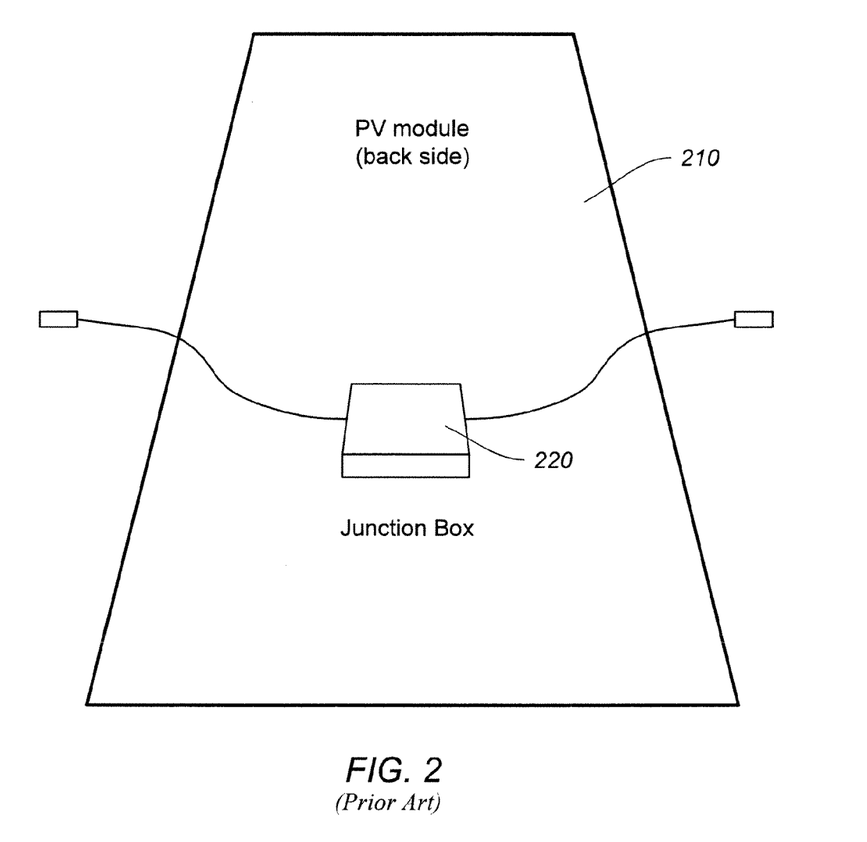
FIG. 2 is a simplified diagram of a conventional photovoltaic module.

Photovoltaics convert sunlight into electricity, providing a desirable source of clean energy. FIG. 1 is a simplified diagram of a conventional photovoltaic array. The photovoltaic array 100 includes strings 1, 2, 3, 4, . . . n, where n is a positive integer larger than or equal to 1. Each string includes photovoltaic (PV) modules (e.g., solar panels) that are connected in series. The photovoltaic array 100 is connected to a central inverter 110, which provides an alternating current (AC) connection to a power grid 120. FIG. 2 is a simplified diagram of a conventional photovoltaic module. The photovoltaic (PV) module 210 includes a junction box 220 on the backside of the PV module 210.

The installation of photovoltaic arrays often presents logistical challenges. Not only does the site for the photovoltaic array need to be properly prepared, but large quantities of materials also need to be transported to and within the site. For example, the site for the photovoltaic array may have existing vegetation that would interfere with the installation and operation of the photovoltaic array. This vegetation usually has to be cleared. The site may also have uneven terrain that usually requires extensive grading and earth moving. Once the site is prepared, it is then often necessary to build an extensive infrastructure on which the strings of PV modules 210 are to be affixed. The PV modules 210 are then moved into position, affixed to the structure, and interconnected so that power can be delivered to the power grid 120. Each of these operations can be time-consuming and expensive.

Hence, it is highly desirable to improve techniques for installation of photovoltaic arrays.

SUMMARY OF THE INVENTION

The present invention is directed to installation of photovoltaic modules in certain embodiments. More particularly, certain embodiments of the invention provide vehicles and methods for managing legs of photovoltaic modules during installation. Merely by way of example, the invention has been applied to magnetically managing legs of rail-based photovoltaic modules during installation. But it would be recognized that the invention has a much broader range of applicability.

According to one embodiment, a method for installing at an installation site a photovoltaic module including a panel and support legs includes disposing the photovoltaic module over a support surface such that the support legs are in a stowed position; lifting the photovoltaic module from a support surface while engaging a magnetic field with the support legs so as to maintain the support legs in the stowed position; disengaging the magnetic field from the support legs of the lifted photovoltaic module so as to release the support legs from the stowed position to an installation position in which the support legs are rotated downwards relative to the stowed position; and lowering the photovoltaic module to the installation site with the support legs in the installation position so as to install the photovoltaic module at the installation site, the support legs supporting the panel at the installation site.

According to another embodiment, a vehicle for installing at an installation site a photovoltaic module including a panel and a plurality of support legs includes a support surface over which the photovoltaic module is disposable such that the support legs are in a stowed position; a lift mechanism; and a suction and magnet assembly including a magnet. The lift mechanism and the suction and magnet assembly can be configured to lift the photovoltaic module from the support surface while engaging a magnetic field of the magnet with the support legs so as to maintain the support legs in the stowed position. The suction and magnet assembly can be configured to disengage the magnetic field from the support legs of the lifted photovoltaic module so as to release the support legs from the stowed position to an installation position in which the support legs are rotated downwards relative to the stowed position. The lift mechanism and the suction and magnet assembly can be configured to lower the photovoltaic module to the installation site with the support legs in the installation position so as to install the photovoltaic module at the installation site, the support legs supporting the panel at the installation site.

Depending upon the embodiment, one or more benefits may be achieved. These benefits and various additional objects, features, and advantages of the present invention can be fully appreciated with reference to the detailed description and accompanying drawings that follow.

DETAILED DESCRIPTION

The present invention is directed to installation of photovoltaic modules in certain embodiments. More particularly, certain embodiments of the invention provide vehicles and methods for managing legs of photovoltaic modules during installation. Merely by way of example, the invention has been applied to magnetically managing legs of rail-based photovoltaic modules during installation. But it would be recognized that the invention has a much broader range of applicability.

Illustratively, the present vehicles and methods can be used for installing rail-based arrays of photovoltaic modules. Such arrays can, in some embodiments, include an elongated rail including first and second support surfaces and at least one mounting surface disposed between the first and second support surfaces. An array of the photovoltaic modules can be coupled to the first mounting surface and raised relative to the first and second support surfaces in a manner such as provided herein. Optionally, a plurality of such rails can be provided, and a corresponding array of photovoltaic modules can be coupled to at least one mounting surface of each such rail in a manner such as provided herein. For further details on exemplary rail-based arrays of photovoltaic modules, see commonly assigned U.S. Patent Publication Nos. 2011/0284057 and 2013/0068275, the entire contents of both of which are incorporated by reference herein.

Under one aspect of the present invention, the installation of an array of photovoltaic modules can be at least partially automated using suitably configured installation vehicles and methods for photovoltaic modules, such as solar panels. For example, a plurality of photovoltaic modules, each of which includes a panel and support legs, can be disposed over a support surface, e.g., a panel pickup area, of the installation vehicle. The support legs of each of the photovoltaic modules can be in a stowed position, for example, can be disposed underneath and substantially parallel to the panel of the corresponding module. The vehicle can transport the plurality of photovoltaic modules to a location sufficiently close to an installation site at which the modules are to be installed. For example, the vehicle can include wheels or treads that can travel along first and second support surfaces of an elongated rail such as described herein or in U.S. Patent Publication Nos. 2011/0284057 and 2013/0068275. The vehicle then can lift a first one of the photovoltaic modules from the support surface while engaging a magnetic field with the support legs of that module so as to maintain the support legs in the stowed position. At any suitable time after the first photovoltaic module is sufficiently clear of the other photovoltaic modules and sufficiently clear of the support surface, the magnetic field can be disengaged from the support legs of the lifted photovoltaic module so as to release the support legs of that module from the stowed position to an installation position in which the support legs are rotated downwards relative to the stowed position. The vehicle then can lower the photovoltaic module to the installation site with the support legs in the installation position so as to install the photovoltaic module at the installation site. The support legs can support the panel of that photovoltaic module at the installation site. One nonlimiting example of an installation site is a predetermined location along an elongated rail.

Figure 3A:
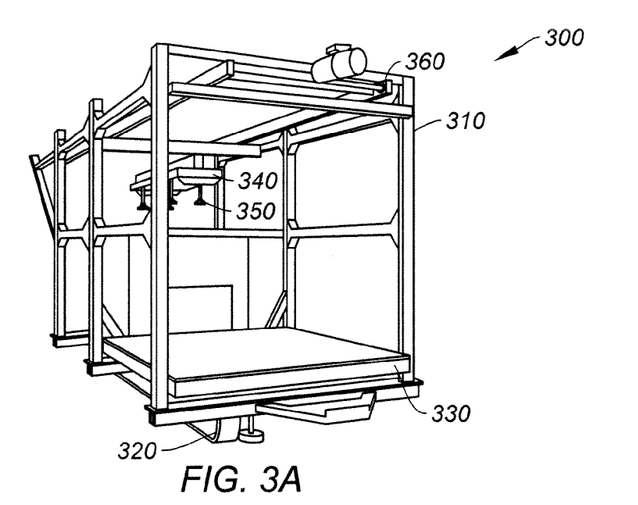
FIGS. 3A-3B are simplified diagrams showing perspective views of a vehicle for installing a photovoltaic module, according to certain embodiments.
Figure 3B:
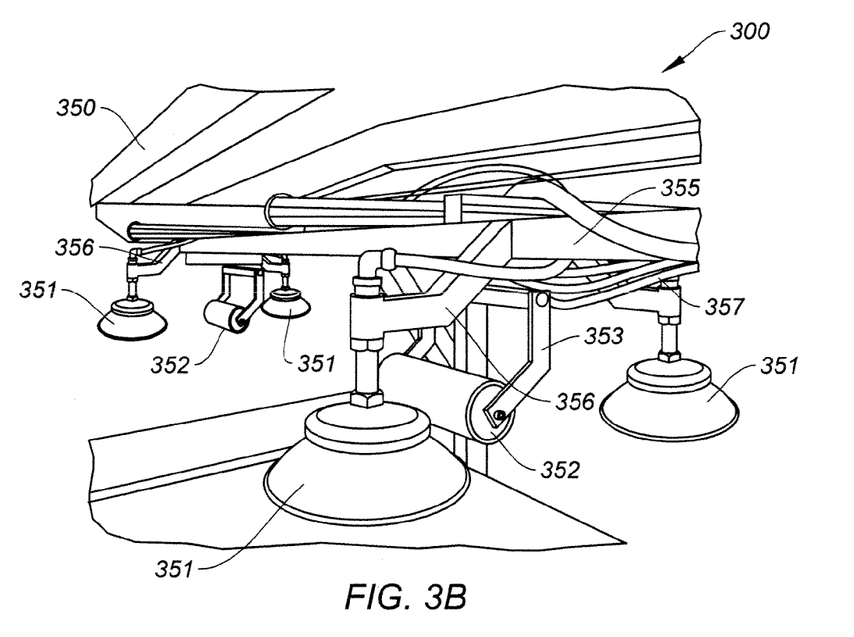

FIGS. 3A-3B are simplified diagrams showing perspective views of a vehicle for installing a photovoltaic module, according to certain embodiments. These diagrams are merely examples, which should not unduly limit the scope of the claims. One of ordinary skill in the art would recognize many variations, alternatives, and modifications.

Installation vehicle 300 illustrated in FIG. 3A, e.g., installation vehicle for photovoltaic modules, such as solar panels, includes a suitable support structure 310, e.g., a plurality of support trusses 310. Installation vehicle 300 also can include suitable wheels, tracks, or caterpillar treads 320 and a motor (not specifically illustrated) coupled to support structure 310 and that facilitate locomotion of vehicle 300, e.g., along first and second support surfaces of an elongated rail upon which installation vehicle 300 can be, but need not necessarily, be disposed. Installation vehicle 300 also can include a support surface 330 coupled to support structure 310 and over which one or a plurality of photovoltaic modules are disposable such that support legs of the module(s) are in a stowed position, e.g., as described in greater detail below with reference to FIGS. 4A-4B. The support surface 330 can be sized so as to accommodate a plurality of photovoltaic modules. Illustratively, the photovoltaic modules can be stacked upon one another over the support surface. Alternatively, or additionally, the photovoltaic modules can be disposed adjacent to one another over the support surface. For example, first and second stacks, each including a plurality of the photovoltaic modules, can be disposed adjacent to one another over the support surface. As such, a plurality of photovoltaic modules, having relatively small footprint, efficiently can be transported to the installation site. In one illustrative embodiment, support surface 330 includes a planar surface characterized by lateral dimensions that are at least as large as lateral dimensions of the photovoltaic modules that are to be transported thereby, and is configured to support the weight of a stack of the photovoltaic modules, e.g., the weight of a stack of 5 or more photovoltaic modules, or the weight of a stack of 10 or more photovoltaic modules. In another illustrative embodiment, support surface 330 includes a planar surface characterized by lateral dimensions that are at least twice as large as lateral dimensions of the photovoltaic modules that are to be transported thereby, and is configured to support the weight of multiple stacks of the photovoltaic modules, e.g., the weight of two or more stacks each of 5 or more photovoltaic modules, or the weight of two or more stacks each of 10 or more photovoltaic modules. Exemplary materials that can be included in support surface 330 include wood, metal, and sturdy, cushioning materials such as rubber.

Installation vehicle 300 also can include lift mechanism 340 and suction and magnet assembly 350 that are configured to lift a photovoltaic module from support surface 330 while engaging a magnetic field of magnet 352 with the support legs of that photovoltaic module so as to maintain the support legs in a stowed position, e.g., as described in greater detail below with reference to FIGS. 4C-4D. Lift mechanism 340 and suction and magnet assembly 350 further can be configured to disengage the magnetic field from the support legs of the lifted photovoltaic module so as to release the support legs from the stowed position to an installation position in which the support legs are rotated downwards relative to the stowed position, e.g., as described in greater detail below with reference to FIGS. 4G-4H. Lift mechanism and suction and magnet assembly 350 further can be configured to lower that photovoltaic module to an installation site with the support legs in the installation position so as to install the photovoltaic module at the installation site, the support legs supporting the panel of that module at the installation site, e.g., as described below with reference to FIG. 4I. Additionally, vehicle 300 also can include gantry 360 to which lift mechanism 340 is coupled and that is configured to horizontally move the lift mechanism 340 and suction and magnet assembly 350 coupled thereto relative to support surface 330. For example, in one illustrative embodiment, lift mechanism 340 can include a scissor lift component including a first end coupled to gantry 360 and a second end coupled to suction and magnet assembly 350, such that the suction and magnet assembly is coupled to gantry 360 via the lift mechanism, and is extendible and retractable so as to controllably lift and lower suction and magnet assembly 350 throughout a range of vertical positions relative to support surface 330 suitable for lifting a photovoltaic module from support surface 330 and lowering that module to an installation site. It should be appreciated that a scissor lift component is only one example of a mechanism that can couple suction and magnet assembly 350 to gantry 360 and can be used to controllably lift and lower suction and magnet assembly 350 throughout a range of vertical positions relative to support surface 330 suitable for lifting a photovoltaic module from support surface 330 and lowering that module to an installation site. Additionally, gantry 360 can be configured to horizontally move lift mechanism 340 and suction and magnet assembly 350 from a position over support surface 330 to a position over an installation site. Further details of exemplary operations of lift mechanism 340, suction and magnet assembly 350, and gantry 360 are provided further below with reference to FIGS. 4A-4I.

Additionally, certain details of an exemplary suction and magnet assembly 350 are illustrated in FIG. 3B, e.g., certain details of magnetic actuation system via cable, in horizontal position. Suction and magnet assembly 350 includes one or more suction cups configured to securely and reversibly engage a panel of a photovoltaic module, e.g., first, second, third, and fourth suction cups 351, and coupled to frame 355 via respective struts 356. For example, based upon lift mechanism 340 lowering suction and magnet assembly 350 to a suitable vertical position relative to a photovoltaic module disposed on support surface 330, suction cups 351 can engage and adhere to the panel of the photovoltaic module, e.g., as described in greater detail below with reference to FIG. 4C. Lift mechanism 340 can be configured so as to subsequently lift suction and magnet assembly 350 vertically away from support surface 330 so as to lift the photovoltaic module from support surface 330, and thereafter to lower suction and magnet assembly, and the photovoltaic module adhered thereto, to an installation site. It should be appreciated that a suction cup is only one example of a gripping mechanism that can securely and releasably engage a photovoltaic module so as to facilitate lifting the module off of support surface 330 and lowering the module to an installation site.

As illustrated in the exemplary embodiment of FIG. 3B, suction and magnet assembly 350 also includes one or more magnets 352, e.g., two magnets, configured to generate magnetic fields that engage support legs of a photovoltaic module so as to maintain the support legs in a stowed position. Each magnet 352 respectively can be coupled to frame 355 via one or more struts 353. Optionally, strut(s) 353 are coupled to an actuation system (not specifically illustrated) via cable(s) so as to facilitate engagement or disengagement of the magnetic field of magnet(s) 352 with the support legs of the photovoltaic module. Additionally, or alternatively, and as described in greater detail below with reference to FIGS. 4G-4H, suction and magnet assembly 350 can be rotated so as to cause disengagement of the magnetic field of magnet(s) 352 with the support legs of the photovoltaic module.

FIGS. 4A-4I are simplified diagrams showing perspective views of certain portions of the vehicle of FIGS. 3A-3B during installation of a photovoltaic module, according to certain embodiments. These diagrams are merely examples, which should not unduly limit the scope of the claims. One of ordinary skill in the art would recognize many variations, alternatives, and modifications. According to certain embodiments, FIGS. 3A-3B and 4A-4I show one or more mechanisms that use one or more magnets to manage folding and unfolding one or more legs of one or more photovoltaic modules (e.g., one or more solar panels).

Figure 4A:
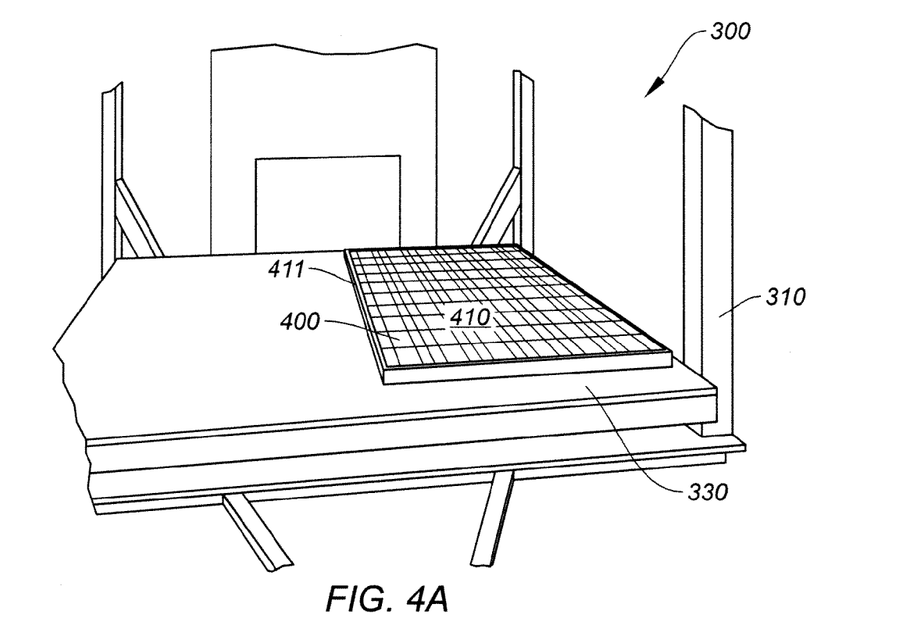
FIGS. 4A-4I are simplified diagrams showing perspective views of certain portions of the vehicle of FIGS. 3A-3B during installation of a photovoltaic module, according to certain embodiments.

FIG. 4A illustrates an exemplary support surface 330, e.g., panel pickup area, upon which photovoltaic module 400 is disposed. Photovoltaic module 400 can include panel 410, a plurality of support legs 401 are rotatable between a stowed position and an installation position, not visible in FIG. 4A, and optional frame 411, e.g., a metal, glass, or plastic frame that substantially surrounds panel 410 and provides a recess within which support legs 401 can be disposed when the legs are in the stowed position. For example, in the embodiment illustrated in FIG. 4A, support legs 401 are not visible because they are in an exemplary stowed position e.g., are rotated to a position in which the legs are beneath panel 410 and substantially parallel to panel 410, and optionally disposed within a recess defined by frame 411. The stowed position can increase a packing density of photovoltaic modules 400. For example, based upon the support legs 401 of photovoltaic module 400 being in the stowed position, a vertical dimension of photovoltaic module 400 can be substantially the same as a vertical dimension of panel 410 or of optional frame 411, and a lateral dimension of photovoltaic module 400 can be substantially the same as a vertical dimension of panel 410 or of optional frame 411. That is, in the stowed position, support legs 401 need not necessarily add any height or width to panel 410 or to optional frame 411.

Additionally, as noted further above, support surface 330 can be sized so as to accommodate a plurality of photovoltaic modules 400. For example, in the exemplary embodiment illustrated in FIG. 4A, support surface 330 can be seen to include lateral dimensions selected so as to accommodate a plurality of photovoltaic modules 400 disposed directly upon the surface of the support surface, e.g., can accommodate two photovoltaic modules 400 disposed side by side on support surface 330. Additionally, frame 310 can define a vertical dimension over support surface 330 that can accommodate one or more stacks of photovoltaic modules 400, e.g., can accommodate two stacks of photovoltaic modules 400 disposed side by side on support surface 330. Based upon the support legs 401 of each such photovoltaic module 400 being in the stowed position, photovoltaic modules 400 readily can be stacked on top of one another with reduced vertical dimension as compared to the support legs being in an installation position at that time. Illustratively, each such photovoltaic module 400 in the stack sequentially can be lifted from support surface 330 with the legs maintained in the stowed position using a magnetic field, the legs released to an installation position by disengaging the magnetic field, and the photovoltaic module then lowered to an installation site.

Figure 4B:
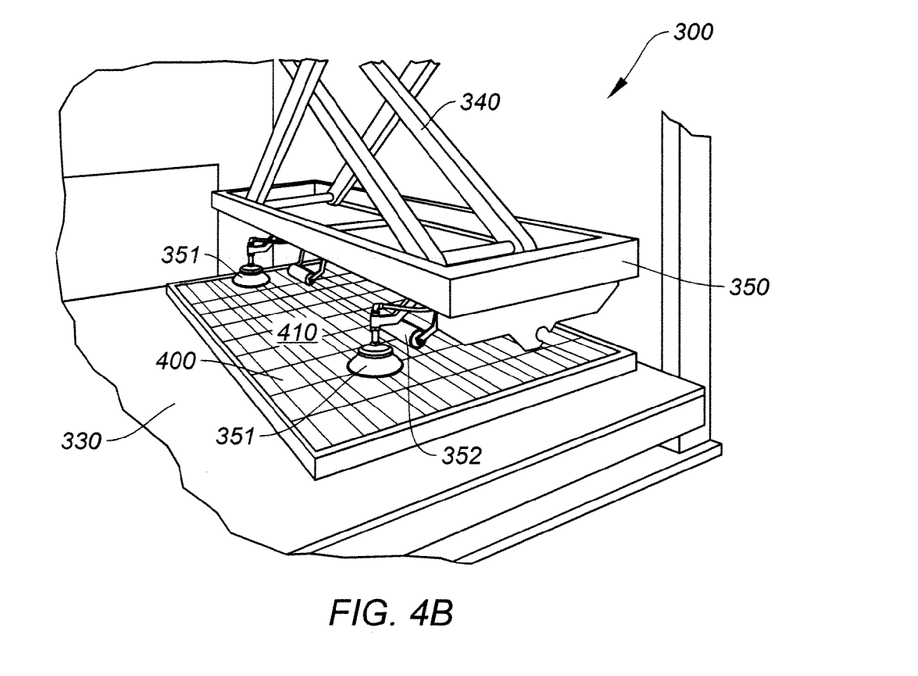
Figure 4C:
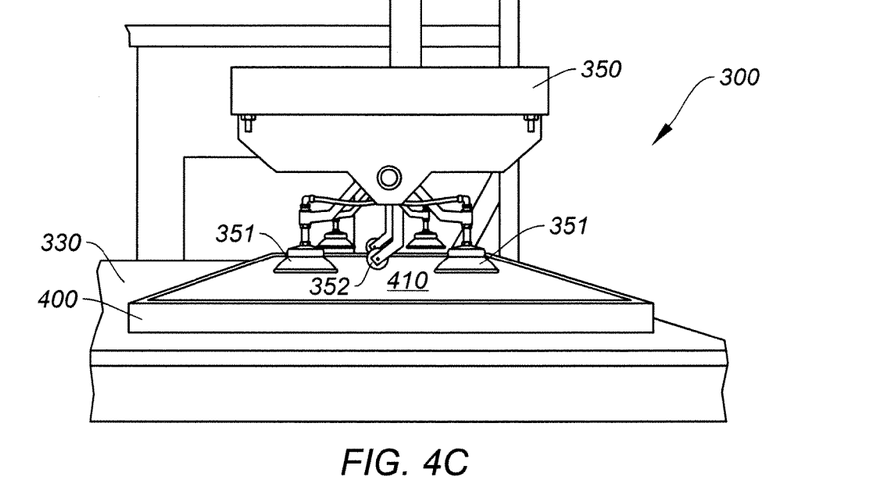
Figure 4D:
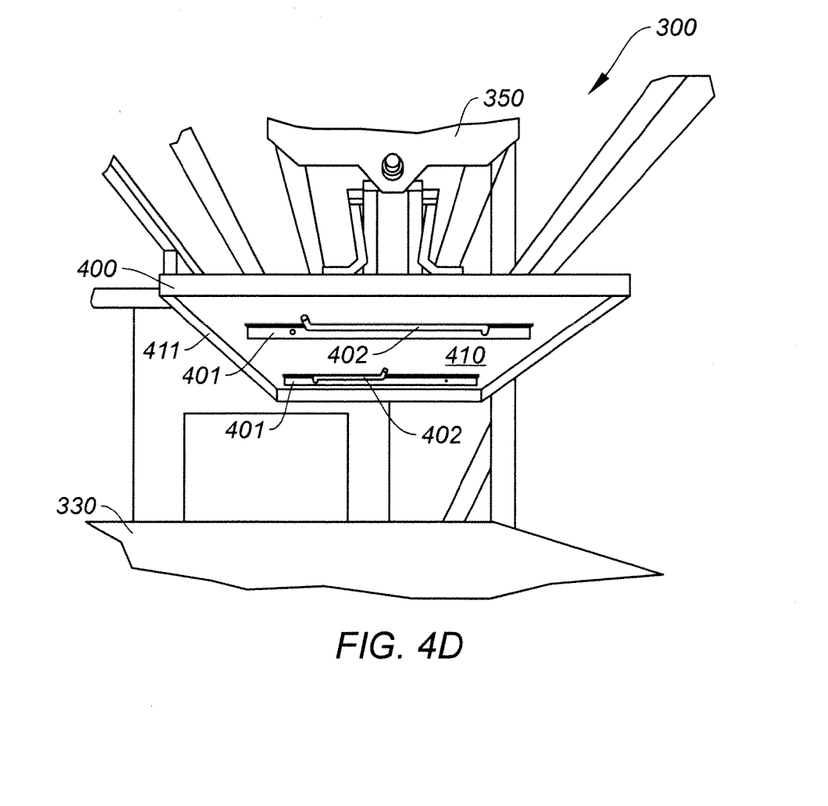

As illustrated in FIG. 4B, suction and magnet assembly 350 is positionable directly over photovoltaic module 400 using gantry 360 and lift mechanism 340, e.g., panel being picked up by suction and magnet assembly on gantry. Additionally, as illustrated in FIG. 4C, lift mechanism 340 is extendible so as to bring suction cups 351 and magnet 352 of suction and magnet assembly 350 into contact with panel 410 of photovoltaic module 400, e.g., magnet touching panel. Responsive to such contact, suction cups 351 securely adhere to panel 410. Additionally, magnet(s) 352 can be brought into sufficient proximity to panel 410 as to exert a sufficient magnetic field on support legs 401 as to maintain the support legs in the stowed position. In one illustrative embodiment, the length and position of struts 353 are selected such that adhesion of suction cups 351 to panel 410 places magnet(s) 352 in contact with an upper surface of panel 410, e.g., as is illustrated in FIG. 4C. Because support legs 401 are disposed beneath and substantially parallel to panel 410, magnet(s) 352 can exert respective magnetic fields upon support legs 401 through panel 410 so as to maintain those legs in the stowed position. In one embodiment, the magnet is used to support (e.g., attract) legs on the underside of solar panel while the panel is moved, as shown in FIG. 4D, e.g., folding legs supported under panel.

For example, lift mechanism 340 is retractable so as to lift suction and magnet assembly 350, and photovoltaic module 400 adhered thereto, from support surface 330. As can be seen in the illustrative embodiment of FIG. 4D, legs 401 of lifted photovoltaic module 400 are substantially parallel to panel 410, e.g., due to engagement of legs 401 with magnetic field(s) of magnet(s) 352. Also, as can be seen in the illustrative embodiment of FIG. 4D, photovoltaic module 400 can include one or more leg mounts 402 that are coupled to panel 410 or to frame 411, or to both panel 410 and frame 411, to which one or more support legs 401 can be movably coupled. In one example, each leg mount 402 includes first and second apertures into which first and second support legs 401 respectively are inserted so as to define joints about which the first and second support legs respectively can be rotated. Illustratively, the first support leg 401 can be disposed on a first lateral side of leg mount 402 and the second support leg 401 can be disposed on a second lateral side of leg mount 402, such that the first and second support legs 401 simultaneously can be maintained in a stowed position, e.g., substantially parallel to panel 410. In the embodiment of FIG. 4D, photovoltaic module 410 includes two such leg mounts 402, each including first and second apertures into which first and second support legs 401 are rotatable inserted.

Figure 4E:
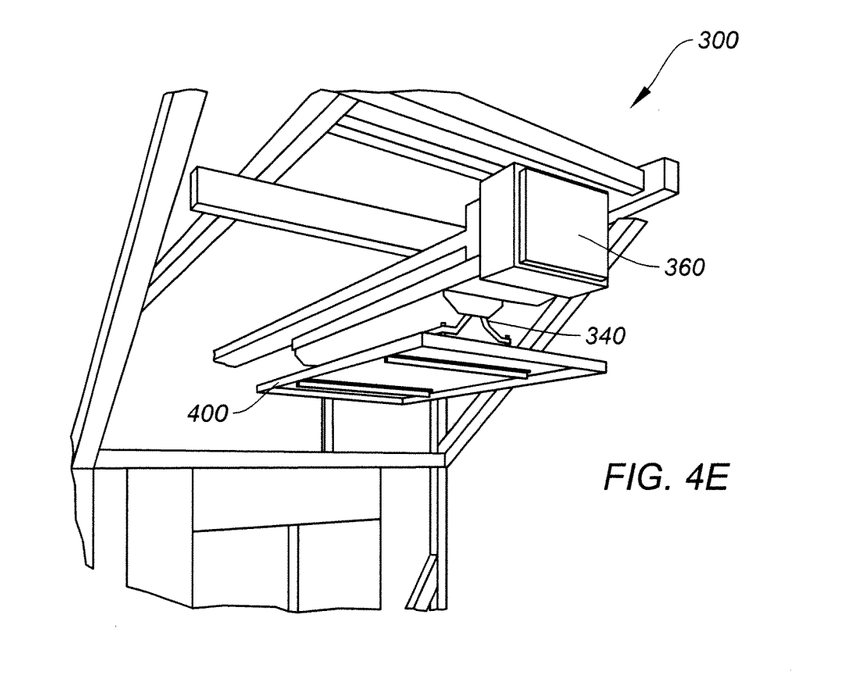
Figure 4F:
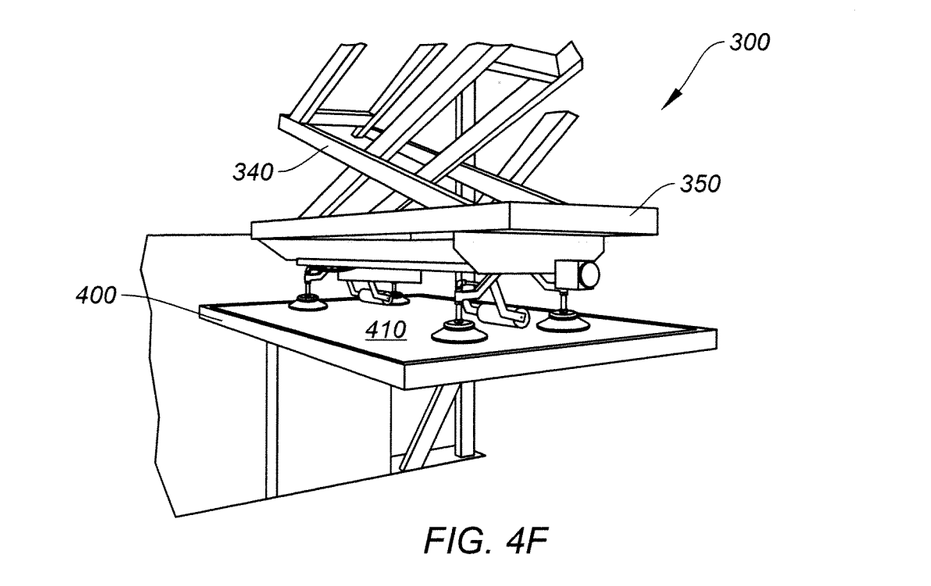

Installation vehicle 300 is configured so as to move lifted photovoltaic module 400 to any suitable position while legs 401 are in the stowed position. In one example, such as illustrated in FIG. 4E, e.g., panel traveling over type of vehicle, panel legs in stowed position, lift mechanism 340 can be partially or fully retracted so as to vertically lift photovoltaic module 400 to a suitable distance above support surface 330 and any other obstacles, and gantry 360 can be actuated so as to horizontally move suction and magnet assembly 350 relative to support surface 330. Additionally, or alternatively, installation vehicle 300 can move, e.g., along vehicle support surfaces of an elongated rail, so as to horizontally move suction and magnet assembly 350 relative to support surface 330. Although not shown in FIG. 4E, in certain embodiments, magnet(s) 352 and suction cup(s) 351 can contact panel 410 of photovoltaic module 400 during the lifting and horizontal movement. Additionally, as illustrated in FIG. 4F, e.g., panel descending horizontally, lift mechanism 340 can be partially or fully extended at any suitable horizontal location so as to lower lifted photovoltaic module 400 to a suitable height. Magnet(s) 352 and suction cup(s) 351 can contact panel 410 of photovoltaic module 400 during the lowering.

Figure 4G:
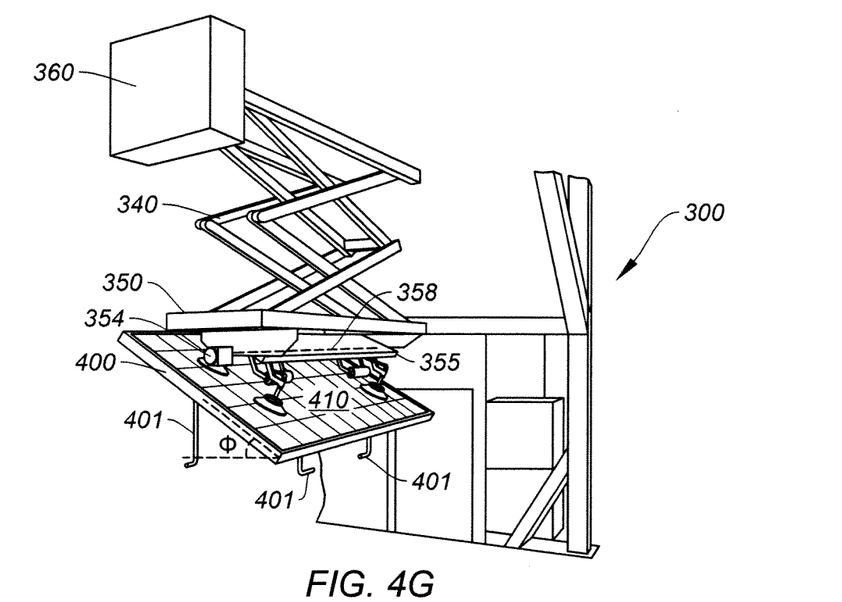
Figure 4H:
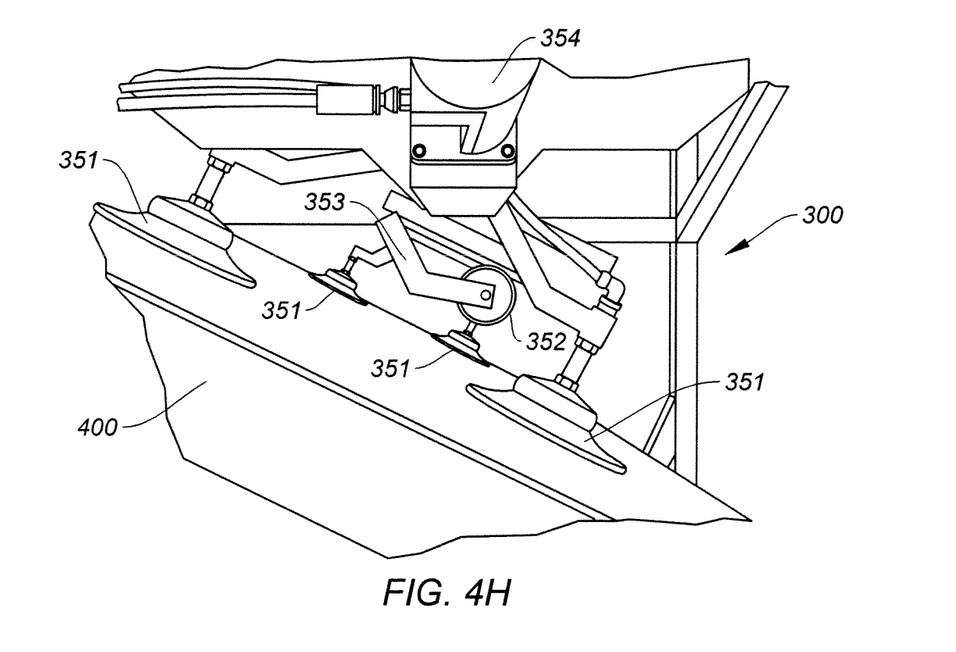

Suction and magnet assembly 350 further can be configured so as to disengage the magnetic field from support legs 401 of lifted photovoltaic module 400 so as to release the support legs from the stowed position to an installation position in which the support legs are rotated downwards relative to the stowed position. In one exemplary embodiment, responsive to disengagement of the magnetic field, the support legs swing downwards under the force of gravity from the stowed position to an installation position, e.g., a position in which the legs are oriented substantially vertically. In one example, as illustrated in FIG. 4G, e.g., panel rotating to installation angle, suction and magnet assembly 350 can be configured to rotate panel 410 of photovoltaic module 400 to an installation angle ϕ. For example, suction and magnet assembly 350 can include actuator 354 configured to rotate frame 355 about axis 358. Suction cups 351 can maintain contact and adhesion to panel 410 during such rotation. However, in certain embodiments, such rotation can move support legs 401 away from magnet(s) 352, e.g., can move magnet(s) 352 out of contact with panel 410, and as such can cause disengaging of magnet(s) 352 from support legs 401. However, it should be appreciated that such rotation need not necessarily be required to disengage the magnetic field from support legs 401. For example, such as illustrated in FIG. 4H, alternatively to rotating the panel, or in addition to rotating the panel, in certain embodiments, suction and magnet assembly 350 can be actuatable so as to move magnet(s) 352 away from support legs 401 so as to cause disengaging of magnet(s) 352 from support legs 401, e.g., by suitably controlling rotation of struts 353 via cable(s) 357 illustrated in FIG. 3B so as to move magnet(s) 352 out of contact with panel 400 and a suitable distance from support legs 401 such that support legs no longer are maintained in the stowed position. The embodiment of FIG. 4H illustrates, e.g., magnet mechanism related to rotation of panel. In one embodiment, such as shown in FIG. 4H, magnet is no longer touching surface of panel in response to panel rotation. In another embodiment, magnet mechanism on separate actuator moves away from panel to disengage with legs in response to panel rotation.

Figure 4I:
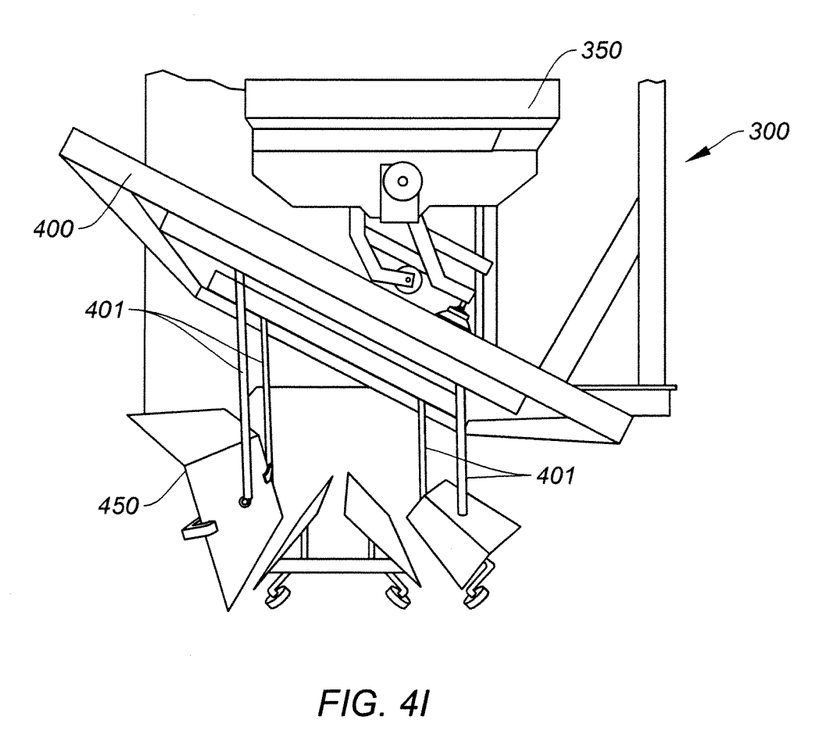

Lift mechanism 340 and suction and magnet assembly 350 further can be configured so as to lower photovoltaic module 400 to an installation site with support legs 401 in the installation position so as to install the photovoltaic module at the installation site, the support legs supporting the panel at the installation site. One nonlimiting example of an installation site is a predetermined location along an elongated rail, e.g., an elongated rail including first and second vehicle support surfaces along which vehicle 300 can be disposed and can move along, and at least one mounting surface disposed between the first and second vehicle support surfaces. In certain embodiments, the at least one mounting surface can include at least one recess configured to receive distal ends of legs 401. For example, the installation site can include a concrete rail including grooves to which support legs 401 are aligned during the lowering. In one example, such as illustrated in FIG. 4I, e.g., legs having been released from storage position under panel, having swung down, lift mechanism 340 can be partially or fully extended so as to vertically lower photovoltaic module 400 towards and into contact with the installation site. For example, lowering photovoltaic module 400 can cause legs 401 to become disposed upon at least one mounting surface of an elongated rail, e.g., respectively can insert distal ends of legs 401 of photovoltaic module 400 into one or more recesses of the elongated rail. Although not shown in FIG. 4I, in certain embodiments, suction cup(s) 351 can contact and adhere to panel 410 of photovoltaic module 400 during the lowering, and can be disengaged from panel 410 upon or after photovoltaic module 400 contacting the installation site. Additionally, in one exemplary embodiment, optional guide assembly 450 aligns legs 401 to grooves in a concrete rail or other elongated rail.

Note that each of the various actuators and motors that can be included in installation vehicle 300 optionally can be powered by a common power source as one another, e.g., each can be powered by a common solar panel, a common battery of vehicle 300, or the engine of vehicle 300, or any suitable combination thereof. Alternatively, some of the actuators and motors can share a first common power source with one another, and others of the actuators an motors can share a second common power source with one another. Alternatively, each actuator and each motor can include its own power source.

Additionally, note that each of the various actuators and motors that can be included in installation vehicle 300 optionally can be controlled by a common controller as one another, e.g., each can be suitably connected to (such as by respective cabling) and controlled by a common controller of vehicle 300 that can be in wired or wireless communication with an interface by which a user can enter instructions that can be transmitted to the controller for implementation. The controller can include a memory and a processor coupled to the memory, The memory can store instructions for causing the processor to receive the instructions from the remote computer and then suitably to implement the instructions. Illustratively, such instructions can include, but are not limited to, one or more of the following: rules defining expected position(s) of photovoltaic module(s) 400 over support surface 330; rules defining vertical positions to which lift mechanism 340 should move suction and magnet assembly 350, e.g., so as to lift a photovoltaic module 400 from support surface 330 or so as to lower a photovoltaic module to an installation site; rules defining steps at which magnet(s) 352 should engage a magnetic field from support legs 401; rules defining steps at which magnet(s) 352 should disengage a magnetic field from support legs 401; rules defining horizontal positions to which installation vehicle 300 should move; rules defining horizontal positions to which gantry 360 should move lift mechanism 340 and suction and magnet assembly 350, e.g., so as to lift a photovoltaic module 400 from support surface 330 or so as to lower a photovoltaic module to an installation site; rules defining steps at which frame 355 of suction and magnet assembly 350 should be rotated; and rules defining steps at which suction cup(s) 351 of suction and magnet assembly 350 should be disengaged from panel 410 of a photovoltaic module 400.

In one illustrative, nonlimiting example, the controller suitably is programmed so as to position lift mechanism 340 and suction and magnet assembly 350 horizontally over a photovoltaic module 400 disposed on support surface 330 using gantry 360, to position suction and magnet assembly 350 vertically so as to contact suction cup(s) 351 and magnet(s) 352 with panel 410 of that photovoltaic module using lift mechanism 340, to position suction and magnet assembly 350 vertically so as to raise that photovoltaic module to a sufficient height over support surface 330 and any obstacles using lift mechanism 340, to position lift mechanism 340 and suction and magnet assembly 350 vertically so as to lower that photovoltaic module to an installation site, and to disengage magnet(s) 352 from support legs 401 of that panel at any suitable time, e.g., prior to lowering that photovoltaic module to the installation site so that the legs are in an installation position and can support the photovoltaic module at the installation site.

Additionally, note that installation vehicle 300 suitably can be used so as to maintain an array of photovoltaic modules, e.g., so as to replace one or more photovoltaic modules of an array, and need not necessarily be limited to newly installing photovoltaic modules.

Figure 5:
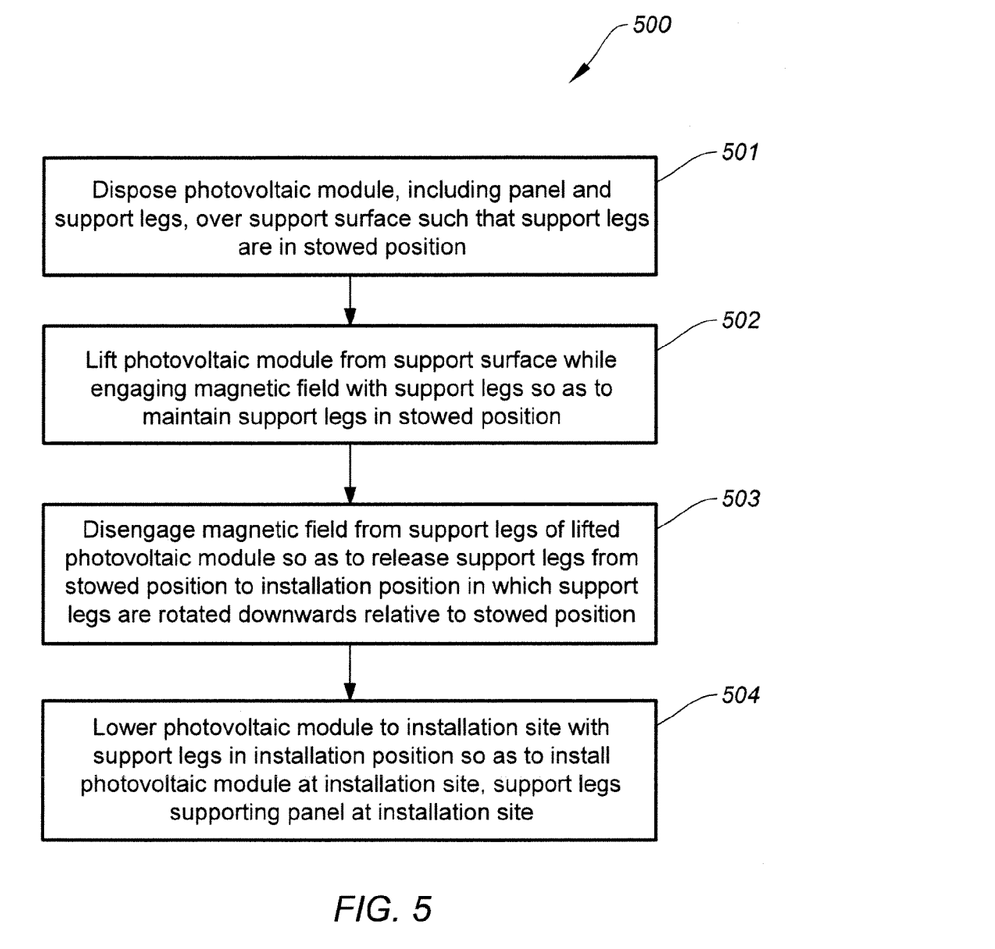
FIG. 5 illustrates steps in an exemplary method for installing a photovoltaic module, according to certain embodiments.

FIG. 5 illustrates steps in an exemplary method for installing a photovoltaic module, according to certain embodiments. This diagram is merely an example, which should not unduly limit the scope of the claims. One of ordinary skill in the art would recognize many variations, alternatives, and modifications.

Method 500 illustrated in FIG. 5 includes disposing a photovoltaic module, including panel and support legs, over a support surface such that the support legs are in a stowed position (501). For example, as illustrated in FIG. 4A, photovoltaic module 400 including panel 410 and support legs 401 can be disposed on support surface 330 of installation vehicle 300. Support legs 401 can be in a stowed position, e.g., can be rotated so as to be disposed underneath and substantially parallel to panel 410, e.g., can be disposed in a recess defined by frame 411. Additionally, as noted above, a plurality of photovoltaic modules can be disposed over the support surface, e.g., can be stacked upon one another or disposed side-by-side relative to one another, or both stacked and disposed side-by-side. The photovoltaic module(s) 400 can be placed manually or automatically upon support surface 330. In one illustrative, nonlimiting example, a pallet of stacked photovoltaic modules 400 can be brought sufficiently close to installation vehicle 300, or vice versa, and installation vehicle 300 can use lift mechanism 340, suction and magnet assembly 350, and gantry 360 so as to individually move the photovoltaic module(s) onto support surface 330 using operations analogous in certain regards to those described above with reference to FIGS. 4A-4I. For example, installation vehicle 300 can position lift mechanism 340 and suction and magnet assembly 350 horizontally over a photovoltaic module 400 disposed on a pallet or other outside surface using gantry 360, can position suction and magnet assembly 350 vertically so as to contact suction cup(s) 351 and magnet(s) 352 with panel 410 of that photovoltaic module using lift mechanism 340, to position suction and magnet assembly 350 vertically so as to raise that photovoltaic module to a sufficient height over the pallet and any obstacles using lift mechanism 340, and to position lift mechanism 340 and suction and magnet assembly 350 vertically so as to lower that photovoltaic module to support surface 330, all while maintaining support legs 401 in a stowed position using magnet(s) 352. Such a process can be repeated any suitable number of times so as to dispose a suitable number of photovoltaic modules 400 over support surface 330. Installation vehicle 330 then can be moved sufficiently close to installation site(s) for those photovoltaic modules, e.g., by moving the installation vehicle along first and second vehicle support surfaces of an elongated rail, e.g., concrete rail, to which the photovoltaic modules are to be installed.

Referring again to FIG. 5, exemplary method 500 also can include lifting the photovoltaic module from the support surface while engaging a magnetic field with the support legs so as to maintain the support legs in a stowed position (step 502). For example, in the illustrative embodiment described above with reference to FIGS. 4B-4D, lift mechanism 340 can lower suction and magnet assembly 350 into contact with panel 410 of photovoltaic module 400 so as to adhere suction cup(s) 351 to panel 410 and so as to engage the magnetic field of magnet(s) 352 with support legs 401 of the photovoltaic module so as to maintain the support legs in a stowed position, e.g., substantially parallel to panel 410, e.g., disposed within a recess defined by frame 411. Additionally, as described above with reference to FIG. 4E, gantry 360 can move lift mechanism 340, suction and magnet assembly 350, and photovoltaic module 400 to a suitable horizontal location, e.g., to a location disposed above the installation site.

In the embodiment illustrated in FIG. 5, method 500 also can include disengaging the magnetic field from the support legs of the lifted photovoltaic module so as to release the support legs from the stowed position to an installation position in which the support legs are rotated downwards relative to the stowed position (503). For example, in the illustrative embodiment described above with reference to FIGS. 4F-4H, lift mechanism 340 can rotate frame 355 or can move magnet(s) 352, or can both rotate frame 355 and can move magnet(s) 352, so as to disengage the magnetic field of magnet(s) 352 from support legs 401, such that the support legs can rotate to an installation position, e.g., can rotate under the force of gravity to a substantially vertical position. Additionally, lift mechanism 340 optionally can partially lower photovoltaic module 400 before releasing support legs 401 by disengaging the magnetic field of magnet(s) 352.

Referring again to FIG. 5, exemplary method 500 also can include lowering the photovoltaic module to the installation site with the support legs in the installation position so as to install the photovoltaic module at the installation site, the support legs supporting the panel at the installation site (504). For example, in the illustrative embodiment described above with reference to FIG. 4I, lift mechanism 340 can extend so as to lower photovoltaic module 400 to an installation site, e.g., can extend so as to contact legs 401 with the installation site. In one nonlimiting embodiment, lift mechanism 340 can extend so as to insert legs 401 into one or more recesses defined in an elongated rail upon which vehicle 300 can be disposed, e.g., can insert first and second legs 401 into a first recess of the elongated rail, and can insert third and fourth legs 401 into a second recess of the elongated rail. The first and second recesses can be disposed between first and second vehicle support surfaces of the elongated rail, e.g., surfaces upon which installation vehicle 300 is disposed. Optionally, the various surfaces and recesses of the elongated rail are integrally formed with one another, e.g., can be formed of concrete. In one example, the installation site includes a concrete rail including grooves to which the support legs are aligned during the lowering.

Note that steps 502-504 illustrated in FIG. 5 can be repeated for any suitable number of photovoltaic modules. For example, based upon a plurality of photovoltaic modules 400 being disposed on support surface 330, installation vehicle sequentially can lift each of those photovoltaic modules from the support surface while engaging a magnetic field with the support legs of that module so as to maintain the support legs in the stowed position, can disengage the magnetic field from the support legs of that lifted photovoltaic module so as to release the support legs from the stowed position to an installation position in which the support legs are rotated downwards relative to the stowed position, and can lower the photovoltaic module to a respective installation site with the support legs in the installation position so as to install the photovoltaic module at the installation site, the support legs supporting the panel of that photovoltaic module at the installation site.

According to yet another embodiment, a method for installing at an installation site a photovoltaic module including a panel and support legs includes disposing the photovoltaic module over a support surface such that the support legs are in a stowed position; lifting the photovoltaic module from a support surface while engaging a magnetic field with the support legs so as to maintain the support legs in the stowed position; disengaging the magnetic field from the support legs of the lifted photovoltaic module so as to release the support legs from the stowed position to an installation position in which the support legs are rotated downwards relative to the stowed position; and lowering the photovoltaic module to the installation site with the support legs in the installation position so as to install the photovoltaic module at the installation site, the support legs supporting the panel at the installation site.

In another example, the support surface is part of an installation vehicle. In another example, the installation vehicle includes a suction and magnet assembly engaging the magnetic field and disengaging the magnetic field. In another example, the installation vehicle further includes a gantry to which the suction and magnet assembly is coupled. In another example, the gantry moves the suction and magnet assembly horizontally relative to the support surface and the installation site. In another example, the installation vehicle further includes a lift mechanism that couples the suction and magnet assembly to the gantry and moves the suction and magnet assembly vertically relative to the support surface and the installation site so as to perform the lifting and lowering. In another example, the suction and magnet assembly includes a plurality of suction cups that adhere to the panel of the photovoltaic module. In another example, engaging the magnetic field includes contacting a magnet to an upper surface of the panel during the applying and the lifting. In another example, the method includes rotating the panel to an installation angle, the rotating moving the support legs away from the magnet so as to cause the disengaging of the magnetic field from the support legs. In another example, the method includes moving the magnet away from the support legs so as to cause the disengaging of the magnet from the support legs responsive to actuation of an actuator. In another example, the support surface is sized so as to accommodate a plurality of photovoltaic modules. In another example, the installation site includes a concrete rail including grooves to which the support legs are aligned during the lowering.

According to another embodiment, a vehicle for installing at an installation site a photovoltaic module including a panel and a plurality of support legs includes a support surface over which the photovoltaic module is disposable such that the support legs are in a stowed position; a lift mechanism; and a suction and magnet assembly including a magnet. The lift mechanism and the suction and magnet assembly can be configured to lift the photovoltaic module from the support surface while engaging a magnetic field of the magnet with the support legs so as to maintain the support legs in the stowed position. The suction and magnet assembly can be configured to disengage the magnetic field from the support legs of the lifted photovoltaic module so as to release the support legs from the stowed position to an installation position in which the support legs are rotated downwards relative to the stowed position. The lift mechanism and the suction and magnet assembly can be configured to lower the photovoltaic module to the installation site with the support legs in the installation position so as to install the photovoltaic module at the installation site, the support legs supporting the panel at the installation site.

In another example, the suction and magnet assembly is coupled to a gantry via the lift mechanism. In another example, the suction and magnet assembly is horizontally movable relative to the support surface via the gantry. In another example, the suction and magnet assembly includes a plurality suction cups configured to adhere to the panel of the photovoltaic module. In another example, the magnet contacts the panel during the lifting. In another example, the suction and magnet assembly are configured to rotate the panel to an installation angle, the rotating moving the support legs away from the magnet so as to cause the disengaging of the magnet from the support legs. In another example, the suction and magnet assembly are actuatable so as to move the magnet away from the support legs so as to cause the disengaging of the magnet from the support legs. In another example, the support surface is sized so as to accommodate a plurality of photovoltaic modules. In another example, the installation site includes a concrete rail including grooves to which the support legs are aligned during the lowering.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed:

1. A method for installing at an installation site a photovoltaic module including a panel and support legs, the method including:
   disposing the photovoltaic module over a support surface such that the support legs are in a stowed position;
   lifting the photovoltaic module from a support surface while engaging a magnetic field with the support legs so as to maintain the support legs in the stowed position;
   disengaging the magnetic field from the support legs of the lifted photovoltaic module so as to release the support legs from the stowed position to an installation position in which the support legs are rotated downwards relative to the stowed position; and
   lowering the photovoltaic module to the installation site with the support legs in the installation position so as to install the photovoltaic module at the installation site, the support legs supporting the panel at the installation site.

2. The method of claim 1, wherein the support surface is part of an installation vehicle.

3. The method of claim 2, wherein the installation vehicle includes a suction and magnet assembly engaging the magnetic field and disengaging the magnetic field.

4. The method of claim 3, wherein the installation vehicle further includes a gantry to which the suction and magnet assembly is coupled.

5. The method of claim 4, wherein the gantry moves the suction and magnet assembly horizontally relative to the support surface and the installation site.

6. The method of claim 4, wherein the installation vehicle further includes a lift mechanism that couples the suction and magnet assembly to the gantry and moves the suction and magnet assembly vertically relative to the support surface and the installation site so as to perform the lifting and lowering.

7. The method of claim 3, wherein the suction and magnet assembly includes a plurality of suction cups that adhere to the panel of the photovoltaic module.

8. The method of claim 1, wherein engaging the magnetic field includes contacting a magnet to an upper surface of the panel during the applying and the lifting.

9. The method of claim 8, further comprising rotating the panel to an installation angle, the rotating moving the support legs away from the magnet so as to cause the disengaging of the magnetic field from the support legs.

10. The method of claim 8, further comprising moving the magnet away from the support legs so as to cause the disengaging of the magnet from the support legs responsive to actuation of an actuator.

11. The method of claim 1, wherein the support surface is sized so as to accommodate a plurality of photovoltaic modules.

12. The method of claim 1, wherein the installation site includes a concrete rail including grooves to which the support legs are aligned during the lowering.

13. A vehicle for installing at an installation site a photovoltaic module including a panel and a plurality of support legs, the vehicle including:
   a support surface over which the photovoltaic module is disposable such that the support legs are in a stowed position;
   a lift mechanism; and
   a suction and magnet assembly including a magnet, wherein the magnet contacts the panel during the lifting,
   the lift mechanism and the suction and magnet assembly being configured to lift the photovoltaic module from the support surface while engaging a magnetic field of the magnet with the support legs so as to maintain the support legs in the stowed position,
   the suction and magnet assembly further being configured to disengage the magnetic field from the support legs of the lifted photovoltaic module so as to release the support legs from the stowed position to an installation position in which the support legs are rotated downwards relative to the stowed position,
   the lift mechanism and the suction and magnet assembly further being configured to lower the photovoltaic module to the installation site with the support legs in the installation position so as to install the photovoltaic module at the installation site, the support legs supporting the panel at the installation site,
   the suction and magnet assembly being configured to rotate the panel to an installation angle, the rotating moving the support legs away from the magnet so as to cause the disengaging of the magnet from the support legs.

14. The vehicle of claim 13, wherein the suction and magnet assembly is coupled to a gantry via the lift mechanism.

15. The vehicle of claim 14, wherein the suction and magnet assembly is horizontally movable relative to the support surface via the gantry.

16. The vehicle of claim 13, wherein the suction and magnet assembly includes a plurality suction cups configured to adhere to the panel of the photovoltaic module.

17. The vehicle of claim 13, the suction and magnet assembly being actuatable so as to move the magnet away from the support legs so as to cause the disengaging of the magnet from the support legs.

18. The vehicle of claim 13, wherein the support surface is sized so as to accommodate a plurality of photovoltaic modules.

19. The vehicle of claim 13, wherein the installation site includes a concrete rail including grooves to which the support legs are aligned during the lowering.

* * * * *